United States Patent [19]

Winter et al.

[11] Patent Number: 5,416,153

[45] Date of Patent: May 16, 1995

[54] POLYOLEFIN MOLDING COMPOSITION OF HIGH RIGIDITY AND HARDNESS

[75] Inventors: Andreas Winter, Glashütten/Taunus; Bernd Bachmann, Eppstein/Taunus, both of Germany

[73] Assignee: Hoechst Aktiengesellschaft, Frankfurt, Germany

[21] Appl. No.: 263,940

[22] Filed: Jun. 22, 1994

Related U.S. Application Data

[63] Continuation of Ser. No. 40,138, Mar. 30, 1993, abandoned.

[30] Foreign Application Priority Data

Mar. 31, 1992 [DE] Germany .................. 42 10 581.1

[51] Int. Cl.$^6$ ............ C08J 3/00; C08K 5/01; C08L 91/08; C08L 23/00
[52] U.S. Cl. .................. 524/489; 524/474; 524/476; 524/477; 524/478; 524/479; 524/480; 524/487; 524/488; 524/515; 524/525; 524/529; 524/534; 525/100; 525/101; 525/105; 525/106; 525/191; 525/232; 525/240
[58] Field of Search .............. 524/474, 476, 477, 478, 524/479, 480, 487, 488, 489, 515, 525, 529, 534; 525/100, 101, 105, 106, 191, 232, 240

[56] References Cited

U.S. PATENT DOCUMENTS

| | | | |
|---|---|---|---|
| 3,322,708 | 5/1967 | Wilson | 524/489 |
| 4,789,714 | 12/1988 | Cozewith et al. | 525/240 |
| 4,933,393 | 6/1990 | Toyota et al. | 525/240 |
| 4,962,262 | 10/1990 | Winter et al. | 585/512 |
| 5,232,993 | 8/1993 | Winter et al. | 525/247 |

FOREIGN PATENT DOCUMENTS

| | | |
|---|---|---|
| 2010065 | 8/1990 | Canada . |
| 0321852 | 6/1989 | European Pat. Off. . |
| 0384263 | 2/1990 | European Pat. Off. . |
| 0433986 | 6/1991 | European Pat. Off. . |
| 0466926 | 1/1992 | European Pat. Off. . |
| 91/14718 | 10/1991 | WIPO . |

OTHER PUBLICATIONS

European Search Report, Jun. 10, 1994, No. 93105015.7.

*Primary Examiner*—Paul R. Michl
*Assistant Examiner*—Patrick Niland
*Attorney, Agent, or Firm*—Connolly and Hutz

[57] ABSTRACT

Polyolefin molding composition of high rigidity and hardness

A polyolefin molding composition essentially comprising
  a) a polyolefin wax and
  b) a high-molecular-weight polyolefin or, instead of b),
  c) a high-molecular-weight olefin copolymer has high rigidity and hardness.

In order to increase the impact strength, this molding composition may additionally be admixed with a rubber having a glass transition temperature of below −20° C.

15 Claims, No Drawings

POLYOLEFIN MOLDING COMPOSITION OF HIGH RIGIDITY AND HARDNESS

This application is a continuation of U.S. Ser. No. 08/040,138 filed Mar. 30, 1993 now abandoned.

The invention relates to a very hard and rigid polyolefin molding composition which comprises a low-molecular-weight polyolefin (polyolefin wax) and a high-molecular-weight polyolefin component.

The preparation of relatively hard polyolefins is known. For this purpose, it is attempted to produce a polyolefin which is as free as possible from atactic components. This is achieved either directly by carrying out the polymerization in a specific way or by subsequently extracting the atactic components formed from the polymer product. These processes represent the state of the art, but the hardnesses achievable in this way are inadequate for a large number of applications (cf., for example, EP-A 336 127).

If the impact strength properties of such polyolefins are improved by admixing rubbers, the hardness, while always remaining relatively high, is also too low for the applications thus opened up, for example in automobile production.

It is furthermore known that relatively high hardness values can be produced in polymers by means of a broad molecular weight distribution (cf. German Patent 41 17 259.0). However, the hardness values achievable in this way are likewise still inadequate for many applications.

The object of the present invention was thus to provide a molding composition which does not have the disadvantageous properties known from the prior art, i.e. a molding composition which has high rigidity and high hardness and may, if desired, be impact-modified by copolymer components.

It has been found, surprisingly, that certain polyolefin molding compositions which can be prepared by direct polymerization (preparation in the polymerization reactor as reactor blends) or by mixing the melts of the individual components satisfy said requirements.

The present invention thus relates to a polyolefin molding composition essentially comprising a) a polyolefin wax derived from an olefin having at least 3 carbon atoms, of the formula $R^a$—CH=CH—$R^b$, in which $R^a$ and $R^b$ are identical or different and are hydrogen or $C_1$-$C_{15}$-alkyl, or $R^a$ and $R^b$ together with the atoms connecting them, form a ring, having a molecular weight $M_w$ of from 1000 to 50,000 g/mol, a molecular weight dispersity $M_w/M_n$ of from 1.8 to 4.0, a viscosity index of from 2 to 50 cm$^3$/g and a melting point of from 120° to 160° C., and b) a polyolefin derived from the olefin mentioned under a), having a molecular weight $M_w$ of >100,000 g/mol, a molecular weight dispersity $M_w/M_n$ of from 1.8 to 4.0, a viscosity index of >80 cm$^3$/g and a melting point of from 120° to 160° C., or, instead of b), c) an olefin copolymer derived from at least two different olefins of the formula $R'$—CH=CH—$R^b$, in which $R^a$ and $R^b$ are identical or different and are hydrogen or $C_1$-$C_{15}$-alkyl, or $R^a$ and $R^b$ together with the atoms connecting them, form a ring, having a molecular weight $M_w$ of >100,000 g/mol, a molecular weight dispersity $M_w/M_n$ of from 1.8 to 4.0, a viscosity index of >80 cm$^3$/g and a melting point of from 90° to 160° C.

The low-molecular-weight component a) and its preparation are known and described, for example, in EP-A 321 852 and EP-A 416 566 and in the working examples. Component a) is preferably a polypropylene wax.

Polyolefins b) and their preparation are known; cf., for example, German Patent 40 35 886.0 (=EP Application No. 91 118 681.5) and the working examples. These are high-molecular-weight, isotactic homopolymers, of which, in particular, polypropylene should be mentioned.

The high-molecular-weight copolymers c) and their preparation are described, for example, in EP-A 365 974, EP-A 384 263, German Patent 40 35 886.0 and the working examples. Ethylene-propylene copolymers are particularly preferred here.

The proportion of components a) and b) or a) and c) in the polyolefin molding composition according to the invention can vary within broad limits. Preferred compositions are those which contain component a) (polyolefin wax) in an amount of 5-90 % by weight, preferably 10-80 % by weight, in particular 20-70 % by weight.

The molding composition according to the invention (a/b or a/c) can be admixed with a suitable rubber in order to increase the impact strength. The preparation can also be carried out by direct polymerization as a polymer blend. These molding compositions are also the subject-matter of the present invention.

In this case, the molding composition comprises from 20 to 99% by weight, preferably from 45 to 95% by weight, of the molding composition described at the outset, comprising a) and b) or a) and c), and from 1 to 80% by weight, preferably from 5 to 55% by weight, of a rubber having a glass transition temperature of below −20° C.

Examples of suitable rubbers are styrene-butadiene rubbers, silicone rubbers, ethylene-propylene rubbers (EPM) and ethylene-propylene-diene rubbers (EPDM). EPM and EPDM rubbers may additionally contain up to 40% by weight of polyethylene. The diene component present may be 1,4-hexadiene, norbornadiene or cyclopentadiene in an amount of up to 10% by weight, based on the total amount of rubber.

The content of ethylene and propylene is unlimited so long as a glass transition temperature of the amorphous component of less than −20° C. is achieved.

A typical composition for commercially available EPM rubbers is, for example, 10-60% of propylene units and 90-40% by weight of ethylene units. Of the ethylene units, 0-40% by weight come under a pure polyethylene component, the remainder form the copolymer component together with the propylene.

EPDM rubbers have a corresponding composition, but, in addition to propylene and ethylene, 1-10% by weight of adiene of the abovementioned type are additionally incorporated in the copolymer component. The melt viscosity of typical EPM and EPDM rubbers is between 0.5 and 300 g/10 min (MFI 230/5).

The Mooney viscosity (measured at 121° C., ML) is typically between 20 and 80. The yield stress at 60% elongation is typically 10–300 psi (pounds/sq inch, 1 psi =6894.8 kg/m sec$^2$=1 Pa ).

Examples of rubbers which can typically be used are on the market under the current trade names Vistaion, Exxelor (Exxon Chemicals), Dutral (Dutral S.A.), Nordel (DuPont) or Buna (Veba).

In addition to components a) and b) or a) and c) and the rubber, the molding composition according to the invention may also contain conventional additives, for example stabilizers, antioxidants, UV absorbers, light protection agents, metal deactivators, free-radical scavengers, fillers and reinforcing agents, compatibilizers, plasticizers, lubricants, emulsifiers, pigments, optical brighteners, flameproofing agents, antistatics and blowing agents.

The molding composition according to the invention is prepared either by direct polymerization and subsequent admixing of additives or part of the molding composition according to the invention is prepared by direct polymerization and then mixed with further components and the additives, or all components of the molding composition are prepared separately and mixed together with the additives.

This mixing can be carried out by the methods which are conventional in plastics processing for mixing polymers and additives.

One possibility is sintering in a high-speed mixer if all the constituents of the molding composition are in powder form.

A further possibility is the use of an extruder with mixing and compounding elements on the screw.

Finally, compounders, as employed in the rubber industry, are also suitable mixing machines.

The mixing temperature depends on the respective composition of the molding composition and can be determined by simple routine trials.

The molding composition according to the invention is distinguished by high hardness values. Molding compositions which contain copolymers or copolymer blends and/or rubber are distinguished by a very good hardness/impact strength ratio, in particular even at temperatures below 0° C. In general, these molding compositions can be used in the form of extruded, injection-molded, foamed or blown moldings in all cases where high rigidity, hardness, dimensional stability and scratch resistance are desired. The use of copolymer/rubber components in the molding composition broadens the applicability to applications which require these properties in combination with impact strength, tear strength and flexural strength. In automobile production, such molding compositions can be employed, for example, for side bump strips, spoilers, seals, mudguard linings, bumper materials, truck and tractor mudguards, scratchproof internal linings for vehicles or wheel covers.

The molding composition according to the invention is furthermore suitable, for example, for the production of tear-resistant films, membrane filters, fibers and filaments. The examples below serve to illustrate the invention in greater detail:

$M_w$=weight average molecular weight (g/mol), determined by gel permeation chromatography
II=isotacticity index (by $^{13}$C-NMR spectroscopy)
$n_{iso}$=mean isotactic chain length (by $^{13}$C-NMR)
$n_{PE}$=mean polyethylene block length
VI=viscosity index, measured at 135° C. at a 0.1% strength solution in decahydronaphthaline in a capillary viscometer
MFI 230/5=melt flow index at 230° C., 5 kg load, in accordance with DIN 53 735
$M_w/M_n$=molecular weight dispersity, determined by gel permeation chromatography Determination of the melting points by DSC (20° C./min)
BIH=ball impression hardness (in accordance with DIN 53 456, compression-molded sheets 4mm in thickness)
$a_{vn}$=notched impact strength in accordance with DIN 53 453, measured on small standard specimens (50×6×4mm) with a V-notch (flank angle 45°, notch depth 1.3 mm, notch radius 1 mm) taken from compression-molded sheets Modulus of elasticity in tension: measured in accordance with 53 497-Z (injection moldings) Izod impact strength and notched impact strength: measured in accordance with ISO 180/1C or ISO 180/1A.

The molding compositions were prepared using a ZSK 28 (Werner & Pfleiderer) twin-screw extruder.

A) Preparation of the Catalysts
rac-dimethylsilyl(2-methyl-1-indenyl)$_2$zirconium dichloride and
racethylene(2-methyl-1-indenyl)$_2$zirconium dichloride I) Synthesis of 2-Me-indene 110.45 g (0.836 mol) of 2-indanone were dissolved in 500 cm$^3$ of diethyl ether, and 290 cm$^3$ of 3N (0.87 mol) etherial methylGrignard solution were added dropwise at such a rate that the mixture refluxed gently. After the mixture had refluxed gently for 2 hours, it was poured into an ice/hydrochloric acid mixture, and the pH was adjusted to 2–3 using ammonium chloride. The organic phase was separated off, washed with NaHCO$_3$ and sodium chloride solution and dried, giving 98 g of crude product (2-hydroxy-2-methylindane), which was not purified further.

This product was dissolved in 500 cm$^3$ of toluene, heated with 3 g of p-toluenesulfonic acid on a water separator until the elimination of water was complete, evaporated, taken up in dichloromethane, filtered through silica gel and distilled in vacuuo (80° C./10 mbar).

Yield: 28.49 g (0.22 mol, 26%).

The synthesis of this compound is also described in: C. F. Koelsch, P. R. Johnson, J. Am. Chem. Soc., 65 (1943) 567–573.

II) Synthesis of (2-Me-indene)$_2$SiMe$_2$ 13 g (100 mmol) of 2-Me-indene were dissolved in 400 cm$^3$ of diethyl ether, 62.5 cm$^3$ of 1.6N (100 mmol) n-butyl-lithium/n-hexane solution were added dropwise over the course of 1 hour with ice cooling, and the mixture was then stirred for a further 1 hour at ≈35° C.

6.1 cm$^3$ (50 mmol) of dimethyldichlorosilane were initially introduced in 50 cm$^3$ of Et$_2$O, and the lithio salt solution was added dropwise at 0° C. over the course of 5 hours, and the mixture was stirred overnight at room temperature and left to stand over the weekend.

The solid which had deposited was filtered off, and the filtrate was evaporated to dryness. After extraction with small portions of n-hexane, the extracts were filtered and evaporated. 5.7 g (18.00 mmol) of white crystals were obtained. The mother liquor was evaporated and then purified by column chromatography (n-hexane/H$_2$CCl$_2$ 9:1 by vol.), giving a further 2.5 g (7.9 mmol—52%) of product (as an isomer mixture).

$R_f$(SiO$_2$; n-hexane/H$_2$CCl$_2$ 9:1 by vol.)=0.37.

III) Synthesis of (2-Me-Ind)₂CH₂CH₂

3 g (23 mmol) of 2-Me-indene were dissolved in 50 cm³ of THF, 14.4 cm³ of 1.6N (23.04 mmol) n-butylithium-n-hexane solution were added dropwise, and the mixture was then stirred at 65° C. for 1 hour. 1 ml (11.5 mmol) of 1,2-dibromoethane were then added at −78° C and the mixture was allowed to warm to room temperature and was stirred for 5 hours. The mixture was evaporated, and the residue was purified by column chromatography (SiO₂; n-hexane/H₂CCl₂ 9:1 by vol.).

The product-containing fractions were combined, evaporated and taken up in dry ether, the ether solution was dried over MgSO₄ and filtered, and the solvent was stripped off.

Yield: 1.6 g (5.59 mmol—49%) of an isomer mixture $R_f$(SiO₂; n-hexane/H₂CCl₂ 9:1 by vol.)=0.46.

IV) Synthesis of rac-dimethylsilyl(2-Me-1-indenyl)₂-zirconium dichloride 1.68 g (5.31 mmol) of the chelate ligand dimethylsilyl(2-methylindene)₂ were introduced into 50 cm³ of THF, and 6.63 cm³ of a 1.6N (10.61 mmol) n-BuLi/n-hexane solution were added dropwise. The addition was carried out at ambient temperature over the course of 0.5 hour. The mixture was stirred for 2 hours at about 35° C., the solvent was stripped off in vacuuo, and the residue was stirred with n-pentane, filtered off and dried.

The resultant dilithio salt was added at −78° C. to a suspension of 1.24 g (5.32 mmol) of ZrCl₄ in 50 cm³ of CH₂Cl₂, and the mixture was stirred at this temperature for 3 hours. The mixture was then allowed to warm to room temperature overnight and was evaporated. The ¹H-NMR spectrum showed, in addition to the presence of some ZrCl₄(thf)₂, a rac/meso mixture. After stirring with n-pentane and drying, the solid, yellow residue was suspended in THF, filtered off and analyzed by NMR spectroscopy. These three working steps were repeated a number of times; finally, 0.35 g (0.73 mmol—14%) of product were obtained in which the rac-form, according to ¹H-NMR, was predominant by more than 17:1.

V) Synthesis of rac-ethylene(2-Me-1-indenyl)₂zirconium dichloride 14.2 cm³ of 2.5N (35.4 mmol) n-BuLi/n-hexane solution were added dropwise over the course of 1 hour to 5.07 g (17.7 mmol) of the ligand ethylene (2-methylindene)₂ in 200 cm³ of THF at room temperature, and the mixture was then stirred at about 50° C. for 3 hours. During this stirring, a precipitate formed in the meantime dissolved again. The mixture was left to stand overnight.

6.68 g (17.7 mmol) of ZrCl₄(thf)₂ in 250 cm³ of THF and simultaneously the above dilithio salt solution were added dropwise to about 50 cm³ of THF at 50° C., and the mixture was then stirred at this temperature for 20 hours. The toluene extract of the evaporation residue was evaporated. The residue was extracted with a little THF and recrystallized from toluene, giving 0.44 g (0.99mmol —5.6%) of product in which the rac-form was predominant to more than 15:1.

B) Polymerization

B1) Preparation of component a) as described in EP-A 321 852 and EP-A 416 566

EXAMPLE 1

A dry 24 dm³ reactor was filled with 12 dm³ of liquid propylene and with 100 dm³ (s.t.p.) of hydrogen. 35 cm³ of a toluene solution of methylaluminoxane (corresponding to 52 mmol of Al, mean degree of oligomerization n=20) were then added, then the batch was stirred at 30° C. for 15 minutes. In parallel, 3.5 mg (0.008 mmol) of racdimethylsilylbis(1-indenyl)zirconium dichloride were dissolved in 13.5 cm³ of a toluene solution of methylaluminoxane (20 mmol of Al) and preactivated by being left to stand for 15 minutes.

This solution was then introduced into the reactor. The polymerization system was warmed to a temperature of 70° C. and kept at this temperature for 1 hour by cooling. The metallocene activity was 943 kg of PP/g of metallocene×h. VI=18 cm³/g: $M_w$=9600 g/mol, $M_w/M_n$=2.0; II =94.9%, $n_{iso}$=35; m.p.=145° C.

EXAMPLE 2

The procedure was as in Example 1, but 4.7 mg ( 0.009 mmol ) of rac-dimethylsilylbis ( 2-methyl-1-indenyl ) zirconium dichloride were used. 2.55 kg of polypropylene were obtained, corresponding to a metallocene activity of 543 kg of PP/g of metallocene×h.

VI=32 cm³/g; $M_w$=12,500 g/tool, $M_w/M_n$=2.3; II =96.5%; m.p.=146° C.

EXAMPLE 3

The procedure was as in Example 1, but no hydrogen was used and the metallocene used was 30.5 mg (0.07 mmol) of rac-isopropylidenebis(indenyl)zirconium dichloride. 2.25 kg of polypropylene wax were obtained. The metallocene activity was 73.8 kg of PP/g of metallocene×h.

VI=14.5 cm³/g; $M_w$=13,500 g/mol, $M_w/M_n$=2.5; II=81.5%, $n_{iso}$=15; m.p. =126° C.

B2) Preparation of component b) as described in European Patent Application No. 91 118 681.5

EXAMPLE 4

The procedure was as in Example 2, but no hydrogen was used. 1.50 kg of polypropylene were obtained, corresponding to a metallocene activity of 319 kg of PP/g of metallocene×h.

VI=191 cm³/g; MFI (230/5)=31 dg/min; $M_w$=200,000 g/mol, $M_w/M_n$=2.3; II=95.6%, $n_{iso}$=40; m.p. =145° C.

B3) Preparation of component c) as described in European Patent Application No. 91 118 681.5

EXAMPLE 5

A dry 24 dm³ reactor was flushed with nitrogen and filled with 2.4 dm³ (s.t.p.) of hydrogen and 12 dm³ of liquid propylene. 35 cm³ of a toluene solution of methylaluminoxane (corresponding to 52 mmol of Al, mean degree of oligomerization n=17) were then added. In parallel, 8.5 mg (0.02 mmol) of rac-dimethylsilylbis(2-methyl-1-indenyl)zirconium dichloride were dissolved in 13.5 cm³ of a toluene solution of methylaluminoxane (20 mmol of Al) and preactivated by being left to stand for 5 minutes. The solution was then introduced into the reactor. The polymerization reaction was carried out at 55° C. for 1 hour with continuous addition of 50 g of ethylene. The metallocene activity was 134 kg of $C_2/C_{l3}$-copolymer/g of metallocene×h. The ethylene content of the copolymer was 4.3%.

VI=289 cm$^3$/g: $M_w$=402,000 g/mol, $M_w/M_n$=2.0; MFI (230/5)=7 dg/min; the ethylene was incorporated in a substantially isolated manner ($^{13}$C-NMR, mean block length $C_2$<1.2).

EXAMPLE 6

A dry 150 dm$^3$ reactor was flushed with nitrogen and filled at 20° C. with 80 dm$^3$ of a benzine cut with the boiling range 100°–120° C. from which the aromatic components had been removed. The gas chamber was then flushed free from nitrogen by injecting 2 bar of propylene and releasing the pressure, and repeating this operation four times. 50 l of liquid propylene were introduced, 64 cm$^3$ of a toluene solution of methylaluminoxane (corresponding to 100 mmol of Al) were added, and the reactor contents were heated to 30° C. A hydrogen content of 0.3% was established in the gas chamber of the reactor by metering in hydrogen and was later maintained during the entire polymerization time by topping up (monitoring on-line by gas chromatography).

24.3 mg of rac-dimethylsilylbis(2-methyl-1-indenyl)-zirconium dichloride (0.05 mmol) were dissolved in 32 ml of a toluene solution of methylaluminoxane (corresponding to 50 mmol of Al) and, after 15 minutes, the solution was introduced into the reactor. Polymerization was carried out in a first step at 50° C. for 10 hours.

In a second step, first 1 kg of ethylene was added rapidly and a further 2 kg of ethylene were metered in continuously over the course of 4 hours. 21.5 kg of block copolymer powder were obtained.

VI=326 cm$^3$/g: $M_w$=407,000 g/mol, $M_{n/Mn}$=3.1; MFI (230/5)=4.9 dg/min. The block copolymer contained 12.5% of ethylene, and fractionation gave a content of 24% of ethylene-propylene rubber (EPR) in the copolymer.

Examples 1–6 show how components a), b) and c) can be prepared. Customized components (molecular weight, tacticity, comonomer content and comonomer incorporation) can be produced in accordance with the prior art by varying the catalyst, the amount of hydrogen or the polymerization conditions.

C) Molding Compositions According to the Invention

EXAMPLE 7

A molding composition comprising 50% by weight of high-molecular-weight isotactic polypropylene and 50% by weight of a polypropylene wax was prepared by extrusion. The components had the following characteristic basic data:

High-molecular-weight component:

VI=370 cm$^3$/g: MFI (230/5) J 2.0 dg/min; $M_w$=467,000 g/mol; $M_w/M_n$=2.3; melting point 155° C.; II=98.0%, $n_{iso}$=80; modulus of elasticity in tension (in accordance with DIN 53 457-Z)=1550 N/mm$^2$; ball impression hardness 79 N/mm$^2$ (compression-molded sheet, conditioned, 358N) and 74 N/mm$^2$ (in accordance with DIN 53 456, injection-molded sheet); Izod impact strength (ISO 180/1 C) 140 mJ/mm$^2$ at 23° C. and 18 mJ/mm$^2$ at −30° C.

Polypropylene wax:

VI=18 cm$^3$/g; MFI (230/5)=not measurable; $M_w$=9600 g/mol; $M_w/M_n$=2.0; melting point 145° C.; II=94.9%; $n_{iso}$=35.

In each case, 10 kg of the polymer components were mixed and the mixture was stabilized against chemical degradation under extrusion conditions by means of 20 g of pentaerithrityl tetrakis[3-(3,5-di-t-butyl-4-hydroxyphenyl)propionate].

The five heating zones of the extruder (Werner+Pfleiderer ZSK 28 twin-screw extruder) were adjusted to 140° C. (feed), 190° C., 250° C., 250° C. and 240° C. (die plate). The extruder screws were operated at 260 rpm. The material temperature of the mixture in the extruder was 220° C. The following data were measured on the molding composition prepared in this way:

VI=200 cm$^3$/g: MFI (230/5)=42 dg/min; $M_w$=300,500 g/mol; $M_w/M_n$=10.7; melting point 148° C.; modulus of elasticity in tension (in accordance with DIN 53 457-Z) =1800 N/mm$^2$; ball impression hardness 96 N/mm$^2$ (compression-molded sheet, conditioned, 358N) and 92 N/mm$^2$ (in accordance with DIN 53 456, injection-molded sheet); Izod impact strength (ISO 180/1 C) 18 mJ/mm$^2$ at 23° C. and 9 MJ/mm$^2$ at −30° C.

EXAMPLE 8

Example 7 was repeated, but the high-molecular-weight component (polypropylene) had the following basic data:

VI=191 cm$^3$/g: MFI (230/5)=31 dg/min; $M_w$=200,000 g/mol; $M_w/M_n$=2.3; melting point 145° C.; II=95.6%; $n_{iso}$=40; modulus of elasticity in tension=1400 N/mm$^2$; ball impression hardness values 80 and 74 N/mm$^2$; Izod impact strength 60 mJ/mm$^2$ at 23° C. and 12 mJ/mm$^2$ at −30° C.

The temperatures in the extruder were 140° C. (feed), 190° C., 200° C., 180° C. and 170° C. (die plate), the extruder screws were operated at 120 rpm, and the material temperature was 185° C. The following data were measured on the molding composition prepared in this way:

VI=93 cm$^3$/g: MFI (230/5)=141 dg/min; $M_w$=119,000 g/mol; $M_w/M_n$=10.0; melting point 145° C.; $H_{melt}$=97 J/g; modulus of elasticity in tension=1720 N/mm$^2$; ball impression hardness values 95 and 90 N/mm$^2$; Izod impact strength 10 mJ/mm$^2$ (23° C.) and 7 mJ/mm$^2$ (−30° C.).

Comparative Example 1

The procedure is as in Example 7, but the low-molecular-weight component is not a polypropylene wax, but instead a polypropylene of low molecular weight. This component had the following basic data:

VI=56 cm$^3$/g: MFI (230/5)=not measurable; $M_w$=52,500 g/mol; $M_w/M_n$=2.1; melting point 145° C.; II=95.0%; $n_{iso}$=34.

The temperatures in the extruder were 140° C. (feed), 190° C., 250° C. 240° C. and 240° C. (die plate), the extruder screws were operated at 260 rpm, and material temperature was 220° C. The following data were measured on the molding composition prepared in this way:

VI=202 cm$^3$/g: MFI (230/5)=39 dg/min; $M_w$=296,000 g/mol; $M_w/M_n$=7.9; melting point 148° C.; modulus of elasticity in tension=1280 N/mm$^2$; ball impression hardness values 77 and 71 N/mm$^2$; Izod impact strength 65 mJ/mm$^2$ (23° C.) and 11 mJ/mm$^2$ (−30° C.).

Comparative Example 2

The procedure is as in Example 7 and Comparative Example 1, but the low-molecular-weight component is not a polypropylene wax, but instead is a low-molecular-weight PP having the following basic data:

VI=111 cm$^3$/g: MFI (230/2.16)=93 dg/min; $M_w$=108,500 g/mol; $M_w/M_n$=2.1; melting point 146° C.; II=95%; $n_{iso}$=34.

The temperatures in the extruder were 155° C. (feed), 215° C., 240° C. 240° C. and 250° C. (die plate), the extruder screws were operated at 190 rpm, and the material temperature was 250° C. The following data were measured on the molding composition prepared in this way:

VI=206 cm$^3$/g: MFI (230/5)=32 dg/min; $M_w$=248,000 g/mol; $M_w/M_n$=3.4; melting point 151° C.; $H_{melt}$=97 J/g; modulus of elasticity in tension=1432 N/mm$^2$; ball impression hardness values 84 and 75 N/mm$^2$; Izod impact strength 69 mJ/mm$^2$ (23° C.) and 12 mJ/mm$^2$ (−30° C.).

Comparative Example 3

Comparative Example 1 is repeated, but the high-molecular-weight component had the following basic data:

VI=769 cm$^3$/g: MFI (230/5)=0.15 dg/min; $M_w$=996,500 g/mol; $M_w/M_n$=2.3; melting point 156° C.; II=98.1%; $n_{iso}$=82.

The temperatures in the extruder were 155° C. (feed), 240° C., 260° C., 260° C. and 250° C. (die plate), the extruder screws were operated at 150 rpm, and the material temperature was 270° C. The following data were measured on the molding composition prepared in this way:

VI=402 cm$^3$/g: MFI (230/5)=7.5 dg/min; $M_w$=714,000 g/mol; $M_w/M_n$=14.2; melting point 150° C.; modulus of elasticity in tension=1315 N/mm$^2$; ball impression hardness values 80 and 77 N/mm$^2$; Izod impact strength 60 mJ/mm$^2$ (23° C.) and 12 mJ/mm$^2$ (−30° C.).

The comparative examples confirm, as compared with the examples, that it is not the broadest possible molecular weight dispersity $M_w/M_n$ that is decisive for achieving high rigidity (ball impression, modulus of elasticity in tension), but instead the type of low-molecular-weight component, which, according to the invention, is a polyolefin wax.

EXAMPLE 9 AND EXAMPLE 10

In contrast to Examples 7 and 8 above, the molding composition according to the invention was not prepared by mixing different polymer powders, but instead the molding composition was prepared directly in the reactor in a two-step polymerization:

EXAMPLE 9

A 24 dm$^3$ reactor was flushed with propylene and filled with 12 l of liquid propylene and with 35 cm$^3$ of a toluene solution of methylaluminoxane (corresponding to 52 mmol of Al, mean degree of oligomerization n=20). In parallel, 3.0 mg (0.006 mmol) of rac-dimethylsilylbis(2-methyl-1-indenyl)zirconium dichloride were dissolved in 13.5 cm$^3$ of a toluene solution of methylaluminoxane (20 mmol of Al) and introduced into the reactor. The polymerization reaction was carried out at 70° C. for 90 minutes. 120 dm$^3$ (s.t.p.) of hydrogen were then introduced into the reactor, and the polymerization reaction was continued for a further 30 minutes. 2.41 kg of polymer were obtained. The polymer was stabilized against chemical degradation under extrusion conditions by means of 4.8 g of pentaerithrityl tetrakis[3-(3,5-di-t-butyl-4-hydroxyphenyl)propionate] and was granulated. The five heating zones of the extruder were adjusted to temperatures of 140° C. (feed), 190° C. 200° C. 200° C. and 180° C. (die plate), the extruder screw was operated at 200 rpm, and the material temperature was 185° C. The following data were measured on the molding composition prepared in this way:

VI=125 cm$^3$/g; MFI (230/5)=92 dg/min; $M_w$=161,000 g/mol, $M_w/M_n$=8 9; m.p. 146° C., $\Delta H_{melt}$100 J/g; modulus of elasticity in tension=1760 N/mm$^2$; ball impression hardness valves 94 and 90 N/mm$^2$; Izod impact strength 19 mJ/mm$^2$ (23° C.) and 12 mJ/mm$^2$ (−30° C.).

EXAMPLE 10

A 24 dm$^3$ reactor was flushed with propylene and filled with 12 l of liquid propylene and with 35 cm$^3$ of a toluene solution of methylaluminoxane (corresponding to 52 mmol of Al, mean degree of oligomerization n=20). In parallel, 3.0 mg (0.006 mmol) of rac-dimethylsilylbis(2-methyl-1-indenyl)zirconium dichloride and 15.0 mg (0.03 mmol) of rac-isopropylidenebis(indenyl)-zirconium dichloride were dissolved in 13.5 cm$^3$ of a toluene solution of methylaluminoxane (20 mmol of Al) and introduced into the reactor. The polymerization reaction was carried out at 70° C. for 1.5 hours. 2.65 kg of polymer were obtained. A molding composition was prepared analogously to Example 9 by granulation, and gave the following data:

VI=100 cm$^3$/g; MFI (230/5)=120 dg/min; $M_w$=125,000 g/mol, $M_w/M_n$=11.5;

m.p. 140° C. (broad); modulus of elasticity in tension=1820 N/mm$^2$; ball impression hardness valves 90 and 88 N/mm$^2$; Izod impact strength 32 mJ/mm$^2$ (23° C.) and 17 mJ/mm$^2$ (−30° C.).

EXAMPLE 11

Example 7 was repeated, but the high-molecular-weight component (ethylene-propylene copolymer) had the following basic data:

VI=289 cm$^3$/g; $M_w$=402,000 g/mol, $M_w/M_n$=2.0; MFI (230/5)=7 dg/min; ethylene content of the polymer 4.3%, incorporation according to $^{13}$C-NMR: mean block length $C_2$<1.2; cf. Example 5.

The temperatures in the extruder were: 140° C. (feed), 200° C., 200° C., 180° C. and 180° C. (die plate), the extruder screws were operated at 200 rpm, and the material temperature was 190° C. The following data were measured on the molding composition prepared in this way;

VI=145 cm$^3$/g; MFI (230/5)=72 dg/min; $M_w$=198,000 g/mol; $M_w/M_n$=9.6; modulus of elasticity in tension=1580 N/mm$^2$; ball impression hardness valves 86 and 80 N/mm$^2$; Izod impact strength 100 mJ/mm$^2$ (23° C.).

EXAMPLE 12

Example 7 was repeated, but the high-molecular-weight component had the following basic data:

VI=326 cm$^3$/g; $M_w$=407,000 g/mol, Ms/M. =3.1; MFI (230/5)=4.9 dg/min; ball impression hardness 60 N/mm$^2$ (compression-molded sheet). This is a block copolymer having an ethylene content of 12.5% by weight, fractionation gave a content of 24% of $C_2/C_3$ rubber (EPR); cf. Example 6.

The temperatures in the extruder were: 140° C. (feed), 220° C. 220° C. 200° C. and 180° C. (die plate), the extruder screws were operated at 200 rpm, and the material temperature was 220° C. The following data were measured on the molding composition prepared in this way;

VI=196 cm$^3$/g; MFI (230/5)=30 dg/min; $M_w$=345,000 g/mol; $M_w/M_n$=12.4; modulus of elasticity in tension=1180 N/mm$^2$; ball impression hardness valves 71 and 70 N/mm$^2$; Izod impact strength: no fracture (23° C.).

EXAMPLE 13

A molding composition comprising 50% by weight of high-molecular-weight isotactic polypropylene and 50% by weight of a polypropylene wax was prepared by extrusion. The components had the following characteristic basic data:

High-molecular-weight components:

VI=393 cm$^3$/g: MFI (230/5)=18 dg/min; $M_w$=498,000 g/mol; $M_w/M_n$=2.1; melting point =152° C.; II=97.0%, $n_{iso}$=65.

Polypropylene wax:

VI=35 cm$^3$/g; MFI (230/5)=not measurable; $M_w$=26,500 g/mol, $M_w/M_n$=2.1; melting point=145° C.; II=94.0%, $n_{iso}$=33.

In each case, 10 kg of the polymer components were mixed and the mixture was stabilized against chemical degradation under extrusion conditions by means of 20 g of pentaerithrityl tetrakis [3- ( 3,5-di-t-butyl-4-hydroxyphenyl)propionate].

The extrusion/granulation was carried out analogously to Example 7. The following data were measured on the molding composition prepared in this way:

VI=196 cm$^3$/g: MFI (230/5)=43 dg/min; $M_w$=326,000 g/mol; $M_w/M_n$=18.3; melting point 153° C.; modulus of elasticity in tension=1950 N/mm$^2$; ball impression hardness 97 N/mm$^2$ (compression-molded sheet, conditioned at 140° C. for 3 hours; 358N) and 90 N/mm$^2$ (in accordance with DIN 53 456, injection-molded sheet); Izod impact strength (ISO 180/1 C) 34.5 mJ/mm$^2$ at 23° C. and 9.4 mJ/mm$^2$ at −30° C.

EXAMPLE 14

The procedure was as in Example 13, but the wax component had the following basic data:

VI 15 cm$^3$/g; $M_w$=7300 g/mol, $M_w/M_n$=2.0; melting point 139° C.; II=93.7%, $n_{iso}$=28.

The following data were measured on the molding composition prepared in this way:

US=195 cm$^3$/g; MFI (230/5)=51 dg/min; $M_w$=318,000 g/mol, $M_w/M_n$=35.7; melting point=150° C.; modulus of elasticity in tension=2092 N/mm$^2$; ball impression hardness valves 91 and 91N/mm$^2$ (compression-molded sheet and injection-molded sheet respectively, 358N).

EXAMPLE 15

The procedure was as in Example 14, but an additional 10 kg of a further high-molecular-weight component were used for the molding composition, which had the following basic data:

VI=197 cm$^3$/g; MFI (230/5)=30 dg/min; $M_w$=198,500 g/mol, $M_w/M_n$=2.1; melting point 148° C.; II=96.4%, $n_{iso}$=50.

The following data were measured on the molding composition prepared in this way:

VI=192 cm$^3$/g; MFI (230/5)=33 dg/min; $M_w$=285,000 g/mol, $M_w/M_n$=16.4; melting point 150° C.; modulus of elasticity in tension=1853 N/mm$^2$; ball impression hardness valves 88 and 84 N/mm$^2$ (compression-molded sheet and injection-molded sheet respectively, 358N).

EXAMPLE 16

The procedure was as in Example 13, but the wax component had the following basic data:

VI=45 cm$^3$/g; $M_w$=33,400 g/mol, $M_w/M_n$=1.9; melting point=140° C.; II=94.0%, $n_{iso}$=30.

The following data were measured on the molding composition prepared in this way:

VI: 202 cm$^3$/g; MFI (230/5)=34 dg/min; $M_w$=320,000 g/mol, $M_w/M_n$=9.0; melting point =152° C.; modulus of elasticity in tension=1540 N/mm$^2$; ball impression hardness valves 87 and 83 N/mm$^2$ (compression-molded sheet and injection-molded sheet respectively, 358N); Izod impact strength 58.1 mJ/mm$^2$ (23° C.) and 11.5 mJ/mm$^2$ (−30° C.).

EXAMPLE 17

The procedure was as in Example 14, but the high-molecular-weight component had the following basic data:

VI=224 cm$^3$/g; MFI (230/5)=20.5 dg/min; $M_w$=259,000 g/mol, $M_w/M_n$=2.2; melting point 139° C.; II=93.5%, $n_{iso}$=25; modulus of elasticity in tension=1350 N/mm$^2$; ball impression hardness valves 68 and 64 N/mm$^2$ (compression-molded sheet and injection-molded sheet respectively, 358N).

The following data were measured on the molding composition prepared in this way:

VI=122 cm$^3$/g; MFI (230/5)=195 dg/min; $M_w$=161,500 g/mol, $M_w/M_n$=18.5; melting point =142° C.; modulus of elasticity in tension=1619 N/mm$^2$; ball impression hardness valves 78 and 73 N/mm$^2$ (compression-molded sheet and injection-molded sheet respectively, 368N).

EXAMPLE 18

The procedure was as in Example 14, but the high-molecular-weight component had the following basic data:

VI=271 cm$^3$/g; MFI (230/5)=6.0 dg/min; $M_w$=289,500 g/mol, $M_w/M_n$=2.0; melting point =160° C.; II=98.9%, $n_{iso}$=109; modulus of elasticity in tension=1623 N/mm$^2$; ball impression hardness valves 90 and 76 N/mm$^2$ (compression-molded sheet and injection-molded sheet respectively, 358N).

The following data were measured on the molding composition prepared in this way:

VI=154 cm$^3$/g; $M_w$=168,000 g/mol, $M_w/M_n$=17.2; MFI (230/5)=74 dg/min; melting point =159° C.; modulus of elasticity in tension=2105 N/mm$^2$; ball impression hardness valves 110 and 96 N/mm$^2$ (compression-molded sheet and injection-molded sheet respectively, 368N).

EXAMPLE 19

The procedure was as in Example 18, but the wax component had the following basic data:

VI=15 cm$^3$/g; $M_w$=8100 g/mol, $M_w/M_n$=1.8; melting point =160° C.; II=98.0%, $n_{iso}$=130.

The following data were measured on the molding composition prepared in this way:

VI=161 cm³/g; $M_w$=170,500 g/mol, $M_w/M_n$=17.0; MFI (230/5)=69 dg/min; melting point =160° C.; modulus of elasticity in tension=2185 N/mm²; ball impression hardness valves 115 and 98 N/mm² (compression-molded sheet and injection-molded sheet measurement respectively, 368N).

EXAMPLE 20

A molding composition comprising 80% by weight of high-molecular-weight isotactic polypropylene and 20% by weight of a polypropylene was prepared by extrusion. The mixing, stabilization and extrusion were carried out as in Example 13. The basic data of the components were:

High-molecular-weight components:

VI=197 cm³/g; MFI (230/5)=32 dg/min; $M_w$=205,000 g/mol, $M_w/M_n$=2.3; melting point =148° C.; II=96.2%, $n_{iso}$=51; modulus of elasticity in tension=1350 N/mm²; ball impression hardness valves 79 and 74 N/mm² (compression-molded sheet and injection-molded sheet respectively, 358N).

Wax component (polypropylene):

VI=14 cm³/g; $M_w$=7600 g/mol, $M_w/M_n$=2.0; melting point =140° C.; II=94.3%, $n_{iso}$=31.

The following data were measured on the molding composition according to the invention or on the moldings produced therefrom:

VI=155 cm³/g; MFI (230/5)=71 dg/min; $M_w$=196,000 g/mol, $M_w/M_n$=10.0; melting point =148° C.; modulus of elasticity in tension=1589 N/mm²; ball impression hardness valves 85 and 79 N/mm² (compression-molded sheet and injection-molded sheet respectively, 358N).

EXAMPLES 21–27

The procedure was as in Example 7, but various amounts of the polypropylene wax component were used. The results are shown in the Table.

| Example | % by weight of polypropylene wax | Ball impression hardness [N/mm²] (compression-molded sheet, conditioned, 358 N) |
|---|---|---|
| 21 | 9 | 85 |
| 22 | 17 | 87 |
| 23 | 23 | 91 |
| 23 | 29 | 90 |
| 25 | 33 | 94 |
| 26 | 37.5 | 93 |
| 27 | 43 | 93 |

We claim:

1. A polyolefin molding composition consisting essentially of:
    a) a polyolefin wax derived from an olefin having at least 3 carbon atoms, of the formula $R^a$—CH=CH—$R^b$, in which $R^a$ and $R^b$ are identical or different and are hydrogen or $C_1$–$C_{15}$-alkyl, or $R^a$ and $R^b$, together with the atoms connecting them, form a ring, said polyolefin wax having a molecular weight $M_w$ of from 1000 to 50,000 g/mol, a molecular weight dispersity $M_w/M_n$ of from 1.8 to 4.0, a viscosity index of from 2 to 50 cm³/g and a melting point of from 120° to 160° C., and
    b) a polyolefin derived from an olefin of said formula set forth in component a), having a molecular weight $M_w$ of >100,000 g/mol, a molecular weight dispersity $M_w/M_n$ of from 1.8 to 4.0, a viscosity index of >80 cm³/g and a melting point of from 120° to 160° C., or, instead of component b),
    c) an olefin copolymer derived from at least two different olefins of the formula $R^a$—CH=CH—$R^b$, in which $R^a$ and $R^b$ are identical or different and are hydrogen or $C_1$–$C_{15}$-alkyl, or $R^a$ and $R^b$, together with the atoms connecting them, form a ring, said olefin copolymer having a molecular weight $M_w$ of >100,000 g/mol, a molecular weight dispersity $M_w/M_n$ of from 1.8 to 4.0, a viscosity index of >80 cm³/g and a melting point of from 90° to 160° C.

2. A polyolefin molding composition as claimed in claim 1, wherein component a) is a polypropylene wax.

3. A polyolefin molding composition as claimed in claim 1 wherein said wax/>100,000-molecular-weight polyolefin combination consists essentially of components a) and b).

4. A polyolefin molding composition as claimed in claim 1 wherein said wax/>100,000-molecular-weight polyolefin combination consists essentially of components a) and c).

5. A polyolefin molding composition as claimed in claim 1, said molding composition further containing a rubber having a glass transition temperature of below negative 20° C., said rubber being present in an amount of from 1 to 80% by weight of said polyolefin molding composition.

6. A polyolefin molding composition as claimed in claim 1, which additionally contains stabilizers, antioxidants, UV absorbers, light protection agents, metal deactivators, free-radical scavengers, fillers and reinforcing agents, compatibilizers, placticizers, lubricants, emulsifiers, pigments, optical brighteners, flameproofing agents, antistatics or blowing agents.

7. A method of using a molding composition as claimed in claim 1, said method comprising the step of producing a molding from said composition.

8. A molding produced from a molding composition as claimed in claim 1.

9. A molding composition as claimed in claim 5, wherein said rubber is a styrene-butadiene rubber, a silicone rubber, an ethylene-propylene rubber, or an ethylene-propylenediene rubber.

10. A molding composition as claimed in claim 9, wherein the rubber is ethylene propylene rubber and additionally contains 0–40% by weight of said molding composition, pure polyethylene.

11. A molding produced from a molding composition as claimed in claim 5.

12. A polyolefin molding composition as claimed in claim 3, wherein component b) is polypropylene.

13. A polyolefin molding composition as claimed in claim 4, wherein component c) is an ethylene-propylene copolymer.

14. A polyolefin composition as claimed in claim 1, wherein said wax/>100,000-molecular-weight polyolefin combination consists essentially of component B (or component C) and 5–90% by weight of said polyolefin molding composition, of component A).

15. A polyolefin composition as claimed in claim 1, wherein said wax/>100,000-molecular-weight polyolefin combination consists essentially of component B (or component C) and 20–70% by weight of said polyolefin composition, of component A).

* * * * *